(12) United States Patent
Wang et al.

(10) Patent No.: US 7,339,741 B1
(45) Date of Patent: Mar. 4, 2008

(54) MULTI-COLOR WIDE ANGLE INFRARED OPTICAL SYSTEMS AND METHODS

(75) Inventors: Yaujen Wang, Arcadia, CA (US); Gilbert Y. Chan, Yorba Linda, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 11/599,536

(22) Filed: Nov. 14, 2006

(51) Int. Cl.
*G92B 27/14* (2006.01)
*G02B 13/14* (2006.01)
*G08B 13/14* (2006.01)

(52) U.S. Cl. .................. 359/629; 359/356; 250/339.01

(58) Field of Classification Search ................ 359/618, 359/626, 629, 634, 636, 637, 738, 355–357; 250/339.01, 338.1, 339.02, 339.05
See application file for complete search history.

(56) References Cited

U.S. PATENT DOCUMENTS 6,423,969 B1 * 7/2002 Amon .................... 250/339.01

\* cited by examiner

*Primary Examiner*—Alcia M Harrington
(74) *Attorney, Agent, or Firm*—Tarolli, Sundheim, Covell & Tummino LLP

(57) ABSTRACT

Systems and methods for providing a wide angle multi-color infrared (IR) optical system are disclosed. In one embodiment, a system is provided that comprises a negative lens configured to receive an incoming light beam scene over a wide FOV and a beam splitter configured to receive incoming light beam associated with the incoming light beam scene from the negative lens and to provide light beams of a first color to a first channel and to provide light beams of a second color to a second channel. The system further comprises a first positive lens assembly arranged to focus light beams of the first color received from the beam splitter on a first image detector, and a second positive lens assembly arranged to focus light beams of the second color received from the beam splitter on a second image detector.

20 Claims, 4 Drawing Sheets

MULTI-COLOR WIDE ANGLE INFRARED OPTICAL SYSTEMS AND METHODS

TECHNICAL FIELD

The present invention relates to optics and, more particularly, to multi-color wide angle infrared (IR) optical systems and methods.

BACKGROUND OF THE INVENTION

Wide angle IR optical systems have a variety of applications, such as in surveillance systems, tracking systems and other wide angle imaging systems. FIG. 1 illustrates a prior art wide angle IR optical system 10. For example, the illustrated system 10 can have an optical speed of F/2 meaning that the ratio of the effective focal length (EFL) of the optical system 10 and the diameter (D) of the entrance pupil is 2. The optical system 10 can, for example, have a 20°×20° field of view (FOV). The optical system 10 includes a negative lens assembly 14 utilized to collect scenes from a wide FOV 12 and a positive lens assembly 20 for focusing the incoming beams onto an image detector 26. The negative lens assembly 14 is a first doublet that includes a negative lens 16 and a positive lens 18. The positive lens assembly 20 is a second doublet formed of a negative lens 22 and a positive lens 24. The positive lens assembly 20 includes an annular stop 21 on a front surface of the negative lens 22 for defining light beam bundles to be focused onto the image detector 26.

The performance of the system 10 is reasonable, if the application is for a single color (i.e., single wavelength bandwidth). However, two important issues arise, when multi-color performance is required. First, there is little room for inserting an optical channel for an additional color. Secondly, even if one or more beamsplitters and the associate optical systems for the additional colors can be inserted, the aberrations (astigmatism, coma and spherical) introduced by the beamsplitters are extremely difficult to compensate. To minimize these aberrations, a convention optical design would require a sophisticated set of focusing lens that includes a compensator, which would substantially complicate the system design and would have many disadvantages, such as increasing weight, package volume, fabrication and alignment costs.

SUMMARY OF THE INVENTION

Systems and methods for providing a wide angle multi-color IR optical system are disclosed. In one aspect of the invention, a system is provided that comprises a negative lens configured to receive an incoming light beam scene over a wide FOV and a beam splitter configured to receive incoming light beam associated with the incoming light beam scene from the negative lens and to provide light beams of a first color to a first channel and to provide light beams of a second color to a second channel. The system further comprises a first positive lens assembly arranged to focus light beams of the first color received from the beam splitter on a first image detector, and a second positive lens assembly arranged to focus light beams of the second color received from the beam splitter on a second image detector.

In yet another aspect of the invention, another wide angle multi-color IR optical system is provided. The system comprises a negative lens configured to receive an incoming light beam scene over a wide field FOV and a beam splitter configured to receive incoming light beam associated with the incoming light beam scene from the negative lens and to provide light beams of a first color to a first channel and to provide light beams of a second color to a second channel. The system further comprises a first positive lens assembly arranged to focus light beams of the first color received from the beam splitter on a first image detector, a second positive lens assembly arranged to focus light beams of the second color received from the beam splitter on a second image detector, a first optical system stop positioned between and spaced apart from the beam splitter and the first positive lens assembly, a second optical system stop positioned between and spaced apart from the second positive lens assembly, a first filter and field flattener positioned between the first positive lens assembly and the first image detector, and a second filter and field flattener positioned between the second positive lens assembly and the second image detector. The first and second filter and field flatteners are configured to further limit the wavelength bandwidth of the first and second colors and to flattening the light beams of the first and second colors.

In yet another aspect of the invention a method of providing a wide angle multi-color IR optical system is provided. The method comprises providing a negative lens configured to receive an incoming light beam scene over a wide FOV, and arranging a beam splitter configured to receive incoming light beam associated with the incoming light beam scene from the negative lens and to provide light beams of a first color to a first channel and to provide light beams of a second color to a second channel. The method further comprises arranging a first and second positive lens assembly associated with respective first and second channels to focus light beams received from the beam splitter on respective image detectors, positioning first and second optical system stops between and spaced apart from the beam splitter and respective first and second positive lens, and positioning first and second filter and field flattener between respective first and second positive lens assemblies and respective image detectors. The first and second filter and field flatteners are configured to further limit the wavelength bandwidth of the first and second colors and to flattening the light beams of the first and second colors.

DETAILED DESCRIPTION OF INVENTION

Systems and methods for providing a wide angle multi-color IR optical system are disclosed. The systems and methods receive an incoming light beam scene over a wide FOV and split the incoming light beam associated with the incoming light beam scene to provide light beams of a first color to a first channel and to provide light beams of a second color to a second channel. The term color is defined as a respective spectral wavelength of light beams.

Figure 1:
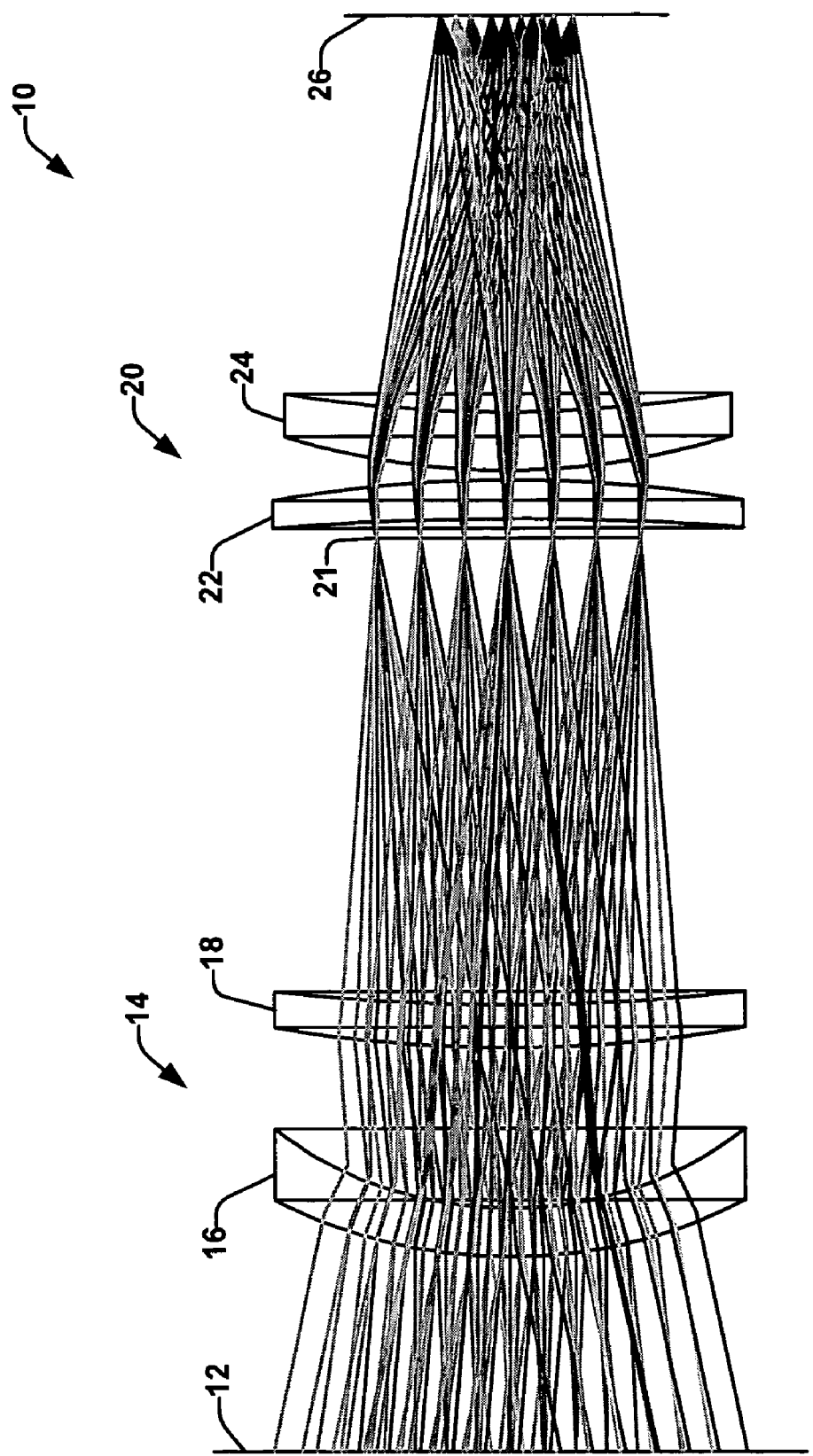
FIG. 1 illustrates a prior art wide angle IR optical system.
Figure 2:
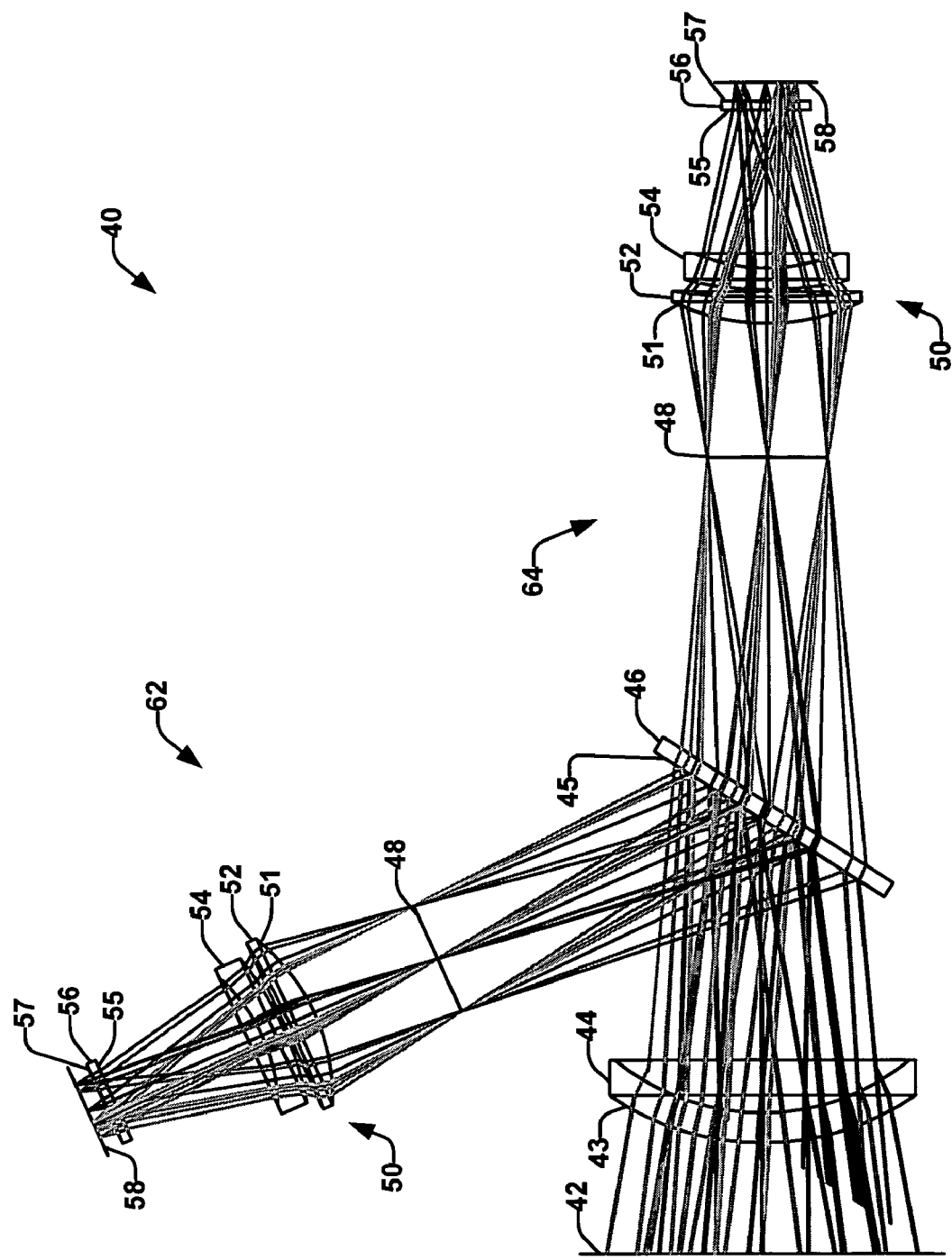
FIG. 2 illustrates a wide angle multi-color IR optical system in accordance with an aspect of the present invention.

FIG. 2 illustrates a wide angle multi-color IR optical system 40 in accordance with an aspect of the present invention. This system can have an optical speed of F/2 similar to the system 10 of FIG. 1 and can have a rectangular FOV of 20°×20°. The exemplary system 40 is a two channel configuration but could include additional channels based on a desired application and acceptable footprint. The two channels in the exemplary system include a transmission channel 64 and a reflection channel 62. For example, a first channel can be assigned as a short wave infrared (SWIR) bandwidth, and a second channel can be assigned as a mid-wave infrared (MWIR) bandwidth. The system 40 includes a negative lens 44 that is employed to collect an incoming light beam scene from a wide FOV 42. To minimize aberrations, a set of high order aspheric coefficients has been applied to a first surface 43 of the negative lens 44. The fabrication of set of higher order aspherical coefficients can be accomplished by modern diamond-turned technology.

The collected light beam scene is transmitted to a dichroic coated phase plate 46 (or beamsplitter). The dichroic coating defines, which of a first wavelength bandwidth (or color) is the transmission channel 64 and which of a second wavelength bandwidth (or color) is a reflection channel 62. A first surface 45 of the dichroic coated phase plate serves to both correct aberrations and to selectively reflect or transmit the first and second wavelength bandwidth of the light beams associated with the light beam scene. The incoming beams passes through the negative lens 44, then either reflect from the first surface 45 of the phase plate 46 or transmits through the dichroic coated phase plate 46. After either reflecting off or transmitting through the dichroic coated phase plate 46, in each channel the beam converges to and is limited by an optical system stop 48, then a positive lens assembly 50 is used to focus the beam, through a filter and field flattener 56, onto respective image detectors 58. The positive lens assembly 50 is a second doublet formed of a positive lens 52 and a negative lens 54. Selection of spectral reflection and transmission channels can be achieved by applying an appropriate interference filter coating on the front surface 45 of the phase plate 46.

It is to be appreciated that light beams passing through phase plate 46 suffer a great deal of image quality degradations. These are the aberrations caused by a converging beam going through a plane-parallel plate with a finite thickness. The aberrations are mainly due to astigmatism plus a small amount of the coma and spherical. To control these aberrations, a set of higher order aspherical coefficients are configured on the front surface 45 of the phase plate 46 to nullify the majority of astigmatism, and coma and spherical coefficients. This is similar to the conventional Schmidt corrector plate. In one aspect of the invention, the set of higher order aspherical coefficients configured on the front surface 45 of the phase plate 46 are decentered. A set of decentered higher order aspherical coefficients means that the coefficients are not centered with respect to the center of the phase plate 46.

To accommodate the phase plate 46 in the system 40, the separation between any two optical elements in the system 40 has to be of an adequate length to control aberrations, and the incoming cone angle has to be reasonable to achieve a better control in aberrations. With that, the separation between the negative lens 44 and the positive lens assembly 50 are greater than that of the conventional system 10 illustrated in FIG. 1. Since the optical system stops 48 are spaced apart from the positive lens assemblies 50, as opposed to being formed on a front surface of the positive lens assembly 20 as illustrated in FIG. 1, better control in the beam bundle size can be achieved in the system 40 and therefore improved aberration control is accomplished.

The positive lens assemblies 50 are configured to optimize the optical image qualities, and to facilitate control in the Petzval curvature so that the images across the fields are flatter. This is accomplished by controlling the bending of each surface, by applying higher aspherical coefficients on a first surface 51 of the positive lens 52, minimizing the chromatic color with the spectral band by using appropriate material for each lens of the positive lens assemblies 50 and correct bending on each surface, and optimizing the optical performances in each band by controlling the bending of each surface and the back focal distance. The positive lens assembly 50 in both the transmission and reflective channels 62 and 64 can be made identical, pending on the requirements, thus providing a substantial cost savings.

The last optical element in each channel is the filter and field flattener 56. A front surface 55 of the filter and field flattener 56 can be coated with a band pass filter coating to further limit the wavelength bandwidth, and a back surface 57 has a concave surface to flatten the field. Also on top of the back surface 57, a set of high order aspheric coefficients has been formed to reduce a bit of distortion and minimize substantially all residual aberrations. The above-described structural configuration of the system 40 provides for a compact, wide field, and fast 2-color optical system, which is nearly diffraction-limited except a small amount of distortion. The small amount of distortion can be compensated with digital electronics and image processing softwares, if needed.

Figure 3:
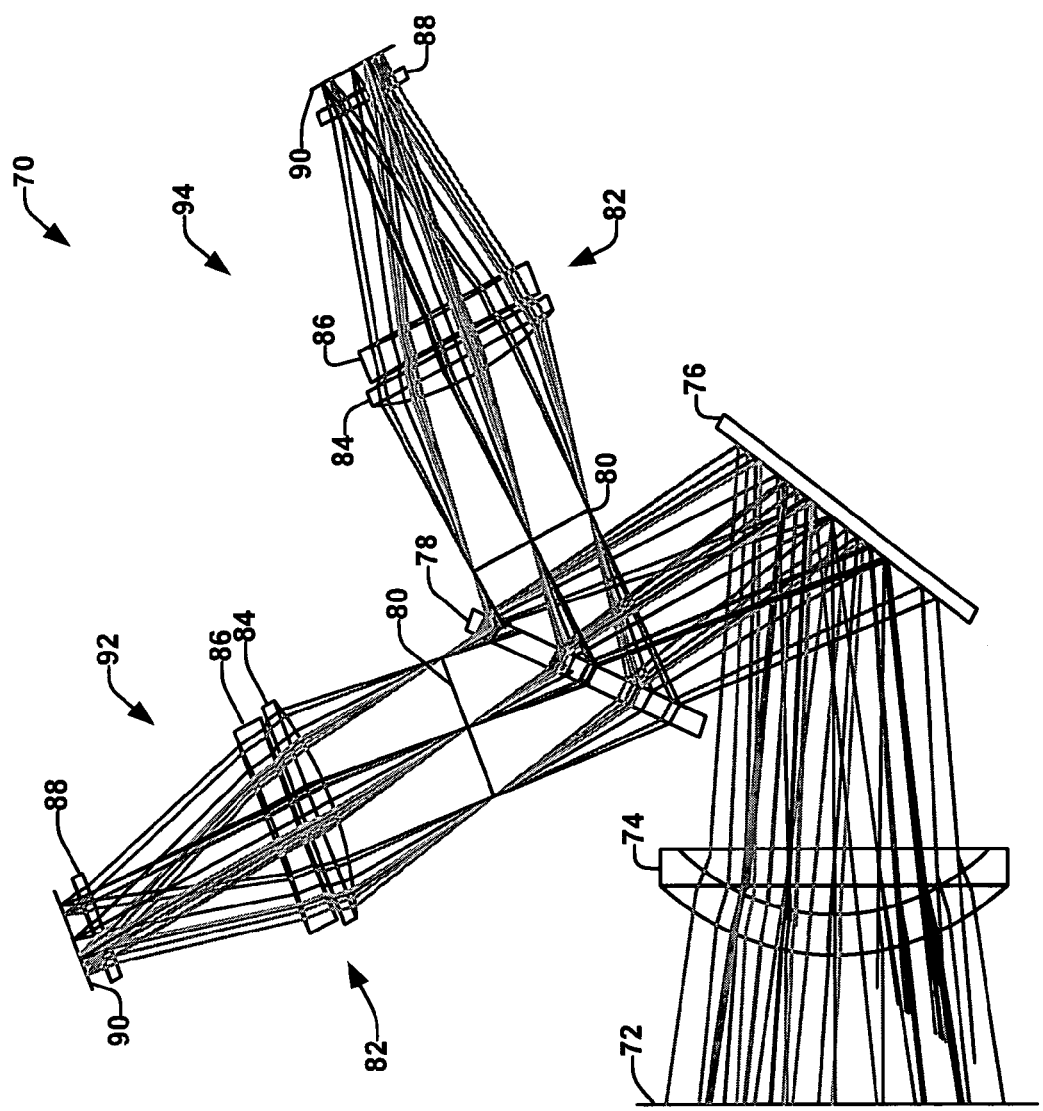
FIG. 3 illustrates another wide angle multi-color IR optical system in accordance with an aspect of the present invention.

FIG. 3 illustrates another wide angle multi-color optical system 70 in accordance with an aspect of the present invention. This system 70 can have an optical speed of F/2 similar to the system 10 of FIG. 1 and can have a rectangular FOV of 20°×20°. The exemplary system 70 is also two channel configuration but could include additional channels based on a desired application and acceptable footprint. The two channels in the exemplary system 70 include a first channel 92 and a second channel 94. For example, one channel can be assigned as a short wave infrared (SWIR) bandwidth, and the other channel as a mid-wave infrared (MWIR) bandwidth. The system includes a negative lens 72 that is employed to collect an incoming light beam scene from a wide FOV 72.

The collected light beam scene is transmitted to a reflecting plate 76. The reflecting plate 76 has a set of decentered high order aspheric coefficients similar to 45 of FIG. 2. The light beams reflected from the reflecting pate 76 are split into two channels by a beam splitter 78. The first channel 92 receives light beams of a first wavelength bandwidth and the second channel 94 receives light beams of a second wavelength bandwidth. After light beams of respective first and second wavelength bandwidths are split by the beam splitter 78, in each channel the beams converge to and are limited by an optical system stop 80, then a positive lens assembly 82 is used to focus the beam, through a filter and field flattener 88, onto respective image detectors 90. The positive lens assembly 82 is a second doublet formed of a negative lens 84 and a positive lens 86.

The positive lens assembly 82 is configured to optimize the optical image qualities, and to facilitate control in the Petzval curvature so that the images across the fields are flatter 88, which can be accomplished by the techniques discuss in FIG. 2. The last optical element in each channel is a filter and field flattener. A front surface 87 of the filter and field flattener 88 can be coated with a band pass filter to further limit the wavelength bandwidth, and a back surface 89 has a concave surface to flatten the field. Also on top of the back surface 89, a set of high order aspheric coefficients has been formed to reduce a bit of distortion and minimize substantially all residual aberrations.

This system of FIG. 3 can be employed when special performances are required, such as improved straylight rejection. For example, if straylight encounters a refractive optical system (FIG. 1 or FIG. 2) it has a significant impact in the background rejection. As the straylight illuminates the negative lens, it can rescatter immediately, then these scattered lights follow the optical train, and create unwanted background all the way to the focal plane directly. However, with a non on-axis reflecting refractor, such as illustrated in the system of FIG. 3, straylight occurs only at a specific incoming angle, even if the first element has been illuminated with straylight at all angles. Thus, the sunshade length in the system of FIG. 3 can be shorter than the systems illustrated in FIG. 1 or FIG. 2.

Additional, the system of FIG. 3 does not require a solar rejection coating to mitigate thermal issues, associated with the Sun and other thermal contributors. An open optical system, such as illustrated in FIG. 1 or FIG. 2 may require a solar rejection coating on the negative lens to reduce the thermal background. Furthermore, if either/both volume and/or weight are a constraint, the system of FIG. 3 provides for a more compact footprint, because the length of the second color channel along the z-axis is shorter than that in the system of FIG. 1 or FIG. 2.

Figure 4:
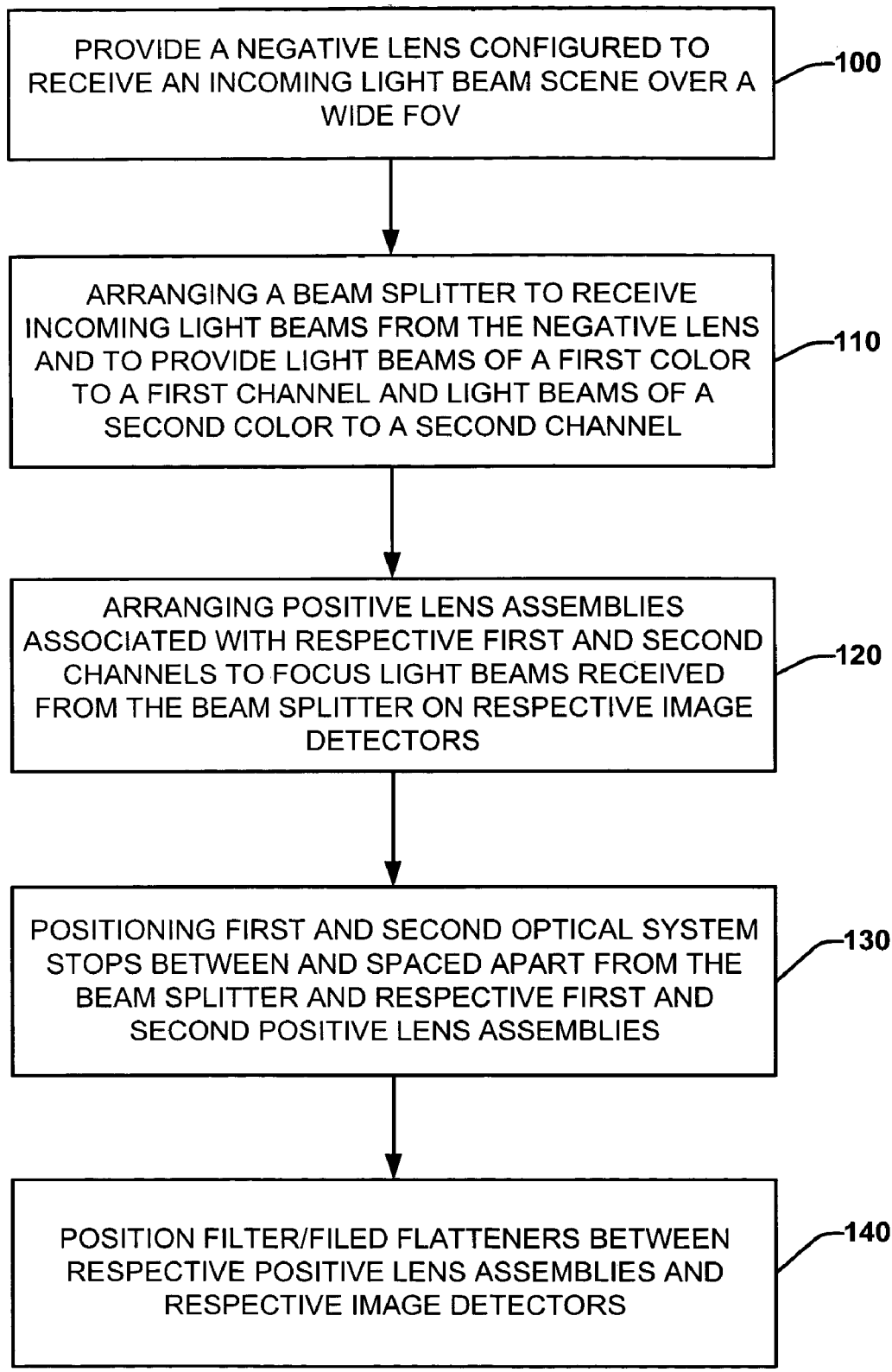
FIG. 4 illustrates a methodology for providing a wide angle multi-color IR optical system in accordance with an aspect of the present invention.

In view of the foregoing structural and functional features described above, methodology in accordance with various aspects of the present invention will be better appreciated with reference to FIG. 4. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 4 illustrates a methodology 200 for providing a wide angle multi-color IR optical system 40 in accordance with an aspect of the present invention. The methodology begins at 100 where a negative lens is provided that is configured to receive an incoming light beam scene over a wide FOV. A front surface of the negative lens may be configured with set of higher order aspherical coefficients. At 110, a beam splitter is arranged to receive the incoming light beams from the negative lens and to provide light beams of a first color or wavelength bandwidth to a first channel and to provide light beams of a second color or wavelength bandwidth to a second channel. The beam splitter can be a dichroic coated phase plate configured to reflect one of the first and second color, and to pass the other of the first and second color. A front surface of the dichroic coated phase plate may be configured with set of higher order aspherical coefficients. The set of higher order aspherical coefficients may be decentered. Alternatively, the beam splitter can be configured to receive light from a reflecting plate and split the light beams into the first color and the second color. The methodology proceeds to 120.

At 120, positive lens assemblies associated with respective first and second channels are arranged to focus light beams received from the beam splitter on respective image detectors. A front surface of the positive lens assemblies may be configured with a set of higher order aspherical coefficients. At 130, first and second optical system stops are positioned between and spaced apart from the beam splitter and respective first and second positive lens. At 140, filter and field flatteners are positioned between respective positive lens assemblies and respective image detectors. The filter and field flatteners can be coated with a band pass filter coating to further limit the wavelength bandwidth, and to have a back concave surface to flatten the field. A front surface of the filter and field flatteners may be configured with set of higher order aspherical coefficients.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A wide angle multi-color infrared (IR) optical system comprising:
    a negative lens configured to receive an incoming light beam scene over a wide field of view (FOV);
    a beam splitter configured to receive incoming light beam associated with the incoming light beam scene from the negative lens and to provide light beams of a first color to a first channel and to provide light beams of a second color to a second channel;
    a first positive lens assembly arranged to focus light beams of the first color received from the beam splitter on a first image detector; and
    a second positive lens assembly arranged to focus light beams of the second color received from the beam splitter on a second image detector.

2. The system of claim 1, further comprising:
    a first filter and field flattener positioned between the first positive lens assembly and the first image detector; and
    a second filter and field flattener positioned between the second positive lens assembly and the second image detector, the first and second filter and field flatteners being configured to further limit the wavelength bandwidth of the first and second colors and to flattening the light beams of the first and second colors.

3. The system of claim 2, wherein a front surface of the first and a second filter and field flattener is configured with a set of higher order aspherical coefficients and a band pass filter coating.

4. The system of claim 1, wherein the beamsplitter is a dichroic coated phase plate configured to reflect the first color to the first channel and to pass the second color to the second channel.

5. The system of claim 1, wherein a front surface of the dichroic coated phase plate is configured with a set of higher order aspherical coefficients.

6. The system of claim 5, wherein the set of higher order aspherical coefficients are decentered.

7. The system of claim 1, wherein a front surface of the negative lens is configured with a set of higher order aspherical coefficients.

8. The system of claim 1, further comprising a reflector configured to reflect incoming light beams associated with the incoming light beam scene from the negative lens to the beam splitter.

9. The system of claim 1, further comprising a first optical system stop positioned between and spaced apart from the beam splitter and the first positive lens and a second optical system stop positioned between and spaced apart from the second positive lens.

10. A wide angle multi-color infrared (IR) optical system comprising:
- a negative lens configured to receive an incoming light beam scene over a wide field of view (FOV);
- a beam splitter configured to receive incoming light beam associated with the incoming light beam scene from the negative lens and to provide light beams of a first color to a first channel and to provide light beams of a second color to a second channel;
- a first positive lens assembly arranged to focus light beams of the first color received from the beam splitter on a first image detector;
- a second positive lens assembly arranged to focus light beams of the second color received from the beam splitter on a second image detector;
- a first optical system stop positioned between and spaced apart from the beam splitter and the first positive lens assembly;
- a second optical system stop positioned between and spaced apart from the second positive lens assembly;
- a first filter and field flattener positioned between the first positive lens assembly and the first image detector; and
- a second filter and field flattener positioned between the second positive lens assembly and the second image detector, the first and second filter and field flatteners being configured to further limit the wavelength bandwidth of the first and second colors and to flattening the light beams of the first and second colors.

11. The system of claim 10, wherein a front surface of both the first and a second filter and field flattener is configured with a set of higher order aspherical coefficients and a band pass filter coating.

12. The system of claim 10, wherein the beamsplitter is a dichroic coated phase plate configured to reflect the first color to the first channel and to pass the second color to the second channel.

13. The system of claim 10, wherein a front surface of the dichroic coated phase plate is configured with a set of decentered higher order aspherical coefficients.

14. The system of claim 10, wherein a front surface of the negative lens is configured with a set of higher order aspherical coefficients.

15. The system of claim 10, further comprising a reflector configured to reflect incoming light beams associated with the incoming light beam scene from the negative lens to the beam splitter.

16. A method of providing a wide angle multi-color infrared (IR) optical system, the method comprising:
- providing a negative lens configured to receive an incoming light beam scene over a wide field of view (FOV);
- arranging a beam splitter configured to receive incoming light beam associated with the incoming light beam scene from the negative lens and to provide light beams of a first color to a first channel and to provide light beams of a second color to a second channel;
- arranging a first and second positive lens assembly associated with respective first and second channels to focus light beams received from the beam splitter on respective image detectors;
- positioning first and second optical system stops between and spaced apart from the beam splitter and respective first and second positive lenses; and
- positioning first and second filter and field flatteners between respective first and second positive lens assemblies and respective image detectors, the first and second filter and field flatteners being configured to further limit the wavelength bandwidth of the first and second color and to flattening the light beams of the first and second color.

17. The method of claim 16, further comprising configuring a front surface of the first and a second filter and field flattener with a set of higher order aspherical coefficients and coating the front surface with a band pass filter coating.

18. The method of claim 16, further comprising dichroic coating a front surface of the beam splitter to configure the beam splitter to reflect the first color to the first channel and to pass the second color to the second channel and configuring the front surface with a set of higher order decentered aspherical coefficients.

19. The method of claim 16, further comprising configuring a front surface of the negative lens with a set of higher order aspherical coefficients.

20. The method of claim 16, further comprising arranging a reflector configured to reflect incoming light beams associated with the incoming light beam scene from the negative lens to the beam splitter.

* * * * *